United States Patent

Johnson et al.

[15] 3,673,327

[45] June 27, 1972

[54] TOUCH ACTUABLE DATA INPUT PANEL ASSEMBLY

[72] Inventors: Ralph G. Johnson, Los Altos; David Fryberger, Palo Alto, both of Calif.

[73] Assignee: The United States of America as represented by the United States Atomic Energy Commission

[22] Filed: Nov. 2, 1970

[21] Appl. No.: 86,011

[52] U.S. Cl...........................178/18, 340/324 A, 340/324 R, 340/365, 250/206

[51] Int. Cl...........................................................H04n 1/00

[58] Field of Search..............................178/18, 19, 20, 17 B; 340/324 R; 323/63; 250/206

[56] References Cited

UNITED STATES PATENTS

| | | | |
|---|---|---|---|
| 3,016,421 | 1/1962 | Harmon | 178/19 |
| 3,134,099 | 5/1964 | Woo | 178/18 |
| 3,423,528 | 1/1969 | Bradshaw et al | 178/19 |
| 3,440,522 | 4/1969 | Kruse | 323/63 |

OTHER PUBLICATIONS

Betts et al, IBM Technical Disclosure Bulletin, Light Beam Matrix Input Terminal, Vol. 9 No. 5 October 1966.

*Primary Examiner*—Kathleen H. Claffy
*Assistant Examiner*—Horst F. Brauner
*Attorney*—Roland A. Anderson

[57] ABSTRACT

A panel positioned over the face of a cathode-ray tube with transmitters mounted along two adjacent edges of the panel to generate beams, either Rayleigh wave beams or light beams, that propagate through the panel to detectors mounted along opposite panel edges. The beams are directed to intersect in an X-Y matrix pattern. Interruption of intersecting beams by touching the panel at the intersection with a beam interrupting object, such as with a finger, develops discrete output signals at the two detectors that define the intersection. The output signals may be applied to a computer which may also be used to control the CRT to display various successive control panel patterns which have correspondence with the beam matrix intersections and are congruent with the intersections.

10 Claims, 7 Drawing Figures

Patented June 27, 1972 3,673,327

2 Sheets-Sheet 1

INVENTORS.
Ralph G. Johnson
David Fryberger
BY
ATTORNEY.

Patented June 27, 1972 3,673,327

2 Sheets-Sheet 2

INVENTORS.
Ralph G. Johnson
BY David Fryberger

Roland A. Anderson
ATTORNEY.

TOUCH ACTUABLE DATA INPUT PANEL ASSEMBLY

BACKGROUND OF THE INVENTION

This invention relates to manually actuated data input devices, and more particularly the invention pertains to a panel that displays a machine control pattern having selectable points corresponding to functions that may be selected by touching the area of the panel at the points corresponding to the desired functions.

Various types of machines and systems require manual input control from a panel or keyboard. Generally the layout of the panel or keyboard is fixed and any modification of the layout requires rewiring. Furthermore, where there is a very large group of simultaneously displayed manual inputs, such as in the control center of a long linear accelerator, it is particularly difficult to rapidly differentiate the desired input from the others in the group. In addition a large group of manual inputs has heretofore resulted in large unwieldy input panels that require a disproportionate amount of space; and to make it convenient to wire the panels, the panels have been generally arranged in groups that relate to physically related groups of components to be controlled rather than to interrelated functions of the overall system. In any case, whether there is a large or small group of inputs, it is desirable to eliminate large amounts of wiring, and moving parts such as electrical contacts, springs and levers which are subject to wear and require regular maintenance.

SUMMARY OF THE INVENTION

In brief, the present invention is a touch actuable data input panel through which a plurality of beams may be propagated simultaneously in a direction transverse to the normal viewing of the panel and each beam interrupted upon touching the panel along the beam path to develop an output signal by the absence of the beam at a corresponding detector. Simultaneous propagation of beams and detection by the absence of a beam leads to simplified electronic circuitry. The use of beams also leaves the panel visually free for a clear display of any desired control pattern which may be permanent or which may be projected on the panel such as by a cathode-ray tube. Such an arrangement may be easily linked to a computer system, is relatively maintenance free, and can handle a very large number of input control patterns. Furthermore, the control patterns can be easily and rapidly changed and arranged according to convenience.

It is an object of the invention to eliminate large amounts of wiring and other hardware such as electrical contacts, springs, levers and other moving parts from a manual input device for machine control.

Another object is to successively display on a panel control patterns that have a plurality of control points, each of which points may be selected by touching the panel with a human finger to initiate a machine function corresponding to that point.

Another object is to provide a data input panel assembly in which a plurality of beams are propagated simultaneously through the panel wherein each beam may be blocked upon touching the panel along the path of the beam to develop an output signal.

Another object is to provide a touch actuable data input panel assembly which has simplified electronic circuitry, is finger actuable, is capable of successively displaying a large number of different control patterns, is easily linked to a computer for control of the computer or the computer and a large system, and is not responsive to incidental touching.

Another object is to use a touch actuable data input panel in conjunction with a cathode-ray tube display.

Other objects and advantageous features of the invention will be apparent in a description of a specific embodiment thereof, given by way of example only, to enable one skilled in the art to readily practice the invention, and described hereinafter with reference to the accompanying drawing.

DESCRIPTION OF AN EMBODIMENT

Figure 1:
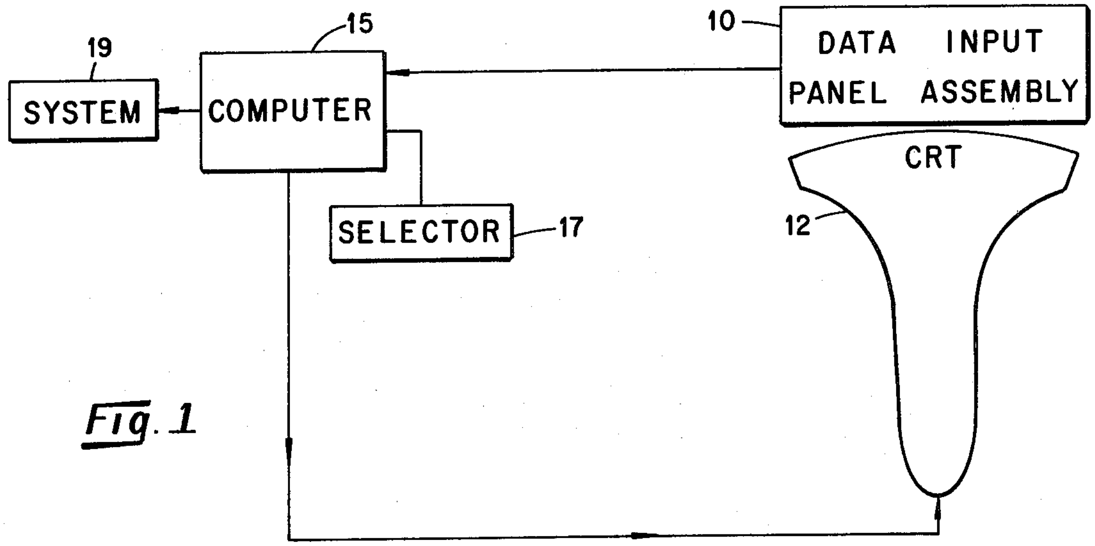
FIG. 1 is a block diagram showing a system under control of a touch actuable data input panel assembly, according to the invention.

Referring to the drawing there is shown in FIG. 1 a block diagram including a touch actuable data input panel assembly 10 positioned over the face of a cathode-ray tube 12. The assembly 10 includes a transparent panel 13 (FIG. 2) through which any patterns displayed on the CRT 12 may be seen from the side of the panel opposite the face of the CRT. The CRT 12 is under the control of a computer 15 for displaying various control patterns. The control pattern to be displayed may be selected at the panel assembly 10 or alternatively at a separate selector 17. By simply pressing on the panel 13 on the area at which the representation of the desired function is displayed discrete signals are transmitted to the computer to carry out the function or to control a system 19, which may for example be a long linear accelerator, to carry out the function.

The panel assembly 10 includes a first group of transmitters 21 (FIG. 2) positioned along a first edge of the panel for simultaneously generating a corresponding group of beams 23 that propagate through the panel 13 in a direction designated as "X," a first group of beam detectors 25 that are positioned along an edge of the panel opposite the first edge for receiving the beams 23, a second group of transmitters 27 positioned along a second edge of the panel adjacent the first edge for simultaneously generating a corresponding group of beams 29 that propagate through the panel 13 in a direction designated as "Y" that is perpendicular to the X direction, and a second group of beam detectors 31 that are positioned along an edge of the panel opposite the transmitters 27 for receiving the beams 29. There is one detector 25 and 31 for each of the transmitters 21 and 27 respectively. The control points of the pattern (not shown) that may be displayed by the CRT 12 are adjusted to coincide with the X–Y matrix intersections formed by the beams 23 and 29. By pressing the panel at an intersection with a beam interrupting object such as a human finger, the beams at that intersection are interrupted, thereby developing a unique pair of output signals, one at a corresponding detector 25 and one at a corresponding detector 31, by the absence of a beam at these two detectors. The resulting signals may be used to control the computer 15 to carry out the function corresponding to the intersection.

Figure 3:
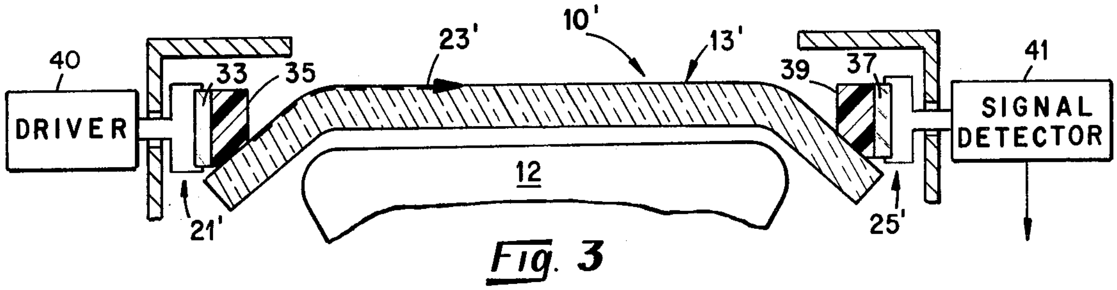
FIG. 3 is a cross-sectional view of a touch actuable data input panel in which Rayleigh waves are employed.
Figure 2:
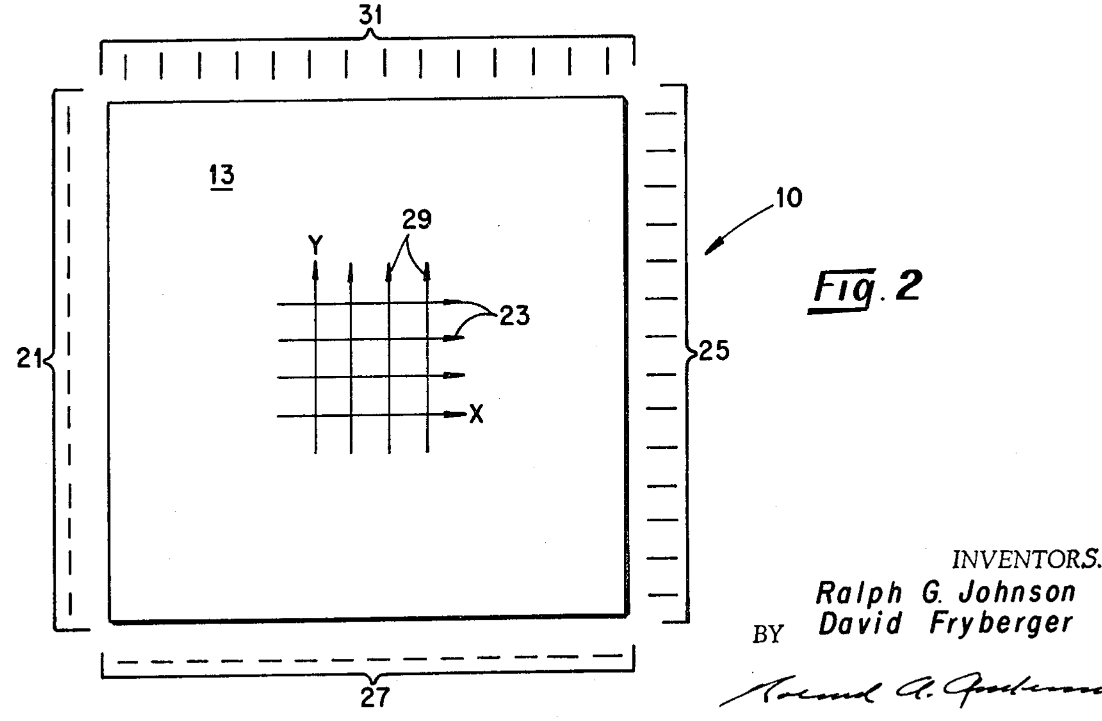
FIG. 2 is a plan view of the data input panel assembly of FIG. 1 showing an X–Y matrix of beams propagating through the panel.

More specifically, there is shown in cross section in FIG. 3 a panel assembly 10′ that includes a transparent glass panel 13′ with a transmitter 21′ positioned along the left edge of the panel and a detector 25′ positioned along the right edge. Other similar transmitters and detectors may be positioned at the edges of the panel as shown in FIG. 2. The transmitter 21′ is comprised of a piezoelectric crystal 33 affixed to a wedge 35 of Lucite (a trademark of the DuPont Corporation). One face of the wedge is cut at an acute angle and is acoustically coupled to the panel 13′ either by glueing or with a high-quality oil. Similarly, the detector 25′ is comprised of a piezoelectric crystal 37 affixed to a wedge 39 of Lucite having one face cut at an acute angle and acoustically coupled to the panel 13′. In operation, the crystal 33 may be pulsed or driven continuously with a driver 40, thereby setting up mechanical vibrations in the wedge 35 which are coupled into the panel 13′. The mechanical vibrations induce a beam of Rayleigh waves 23′ along the surface of the panel 13′. The detector 25′ is positioned directly opposite the transmitter 21′ so that the beam 23′ is intercepted by the wedge 39, thereby inducing mechanical vibrations in the wedge 39 and crystal 37 which are transduced to electrical signals in the crystal. The signals are fed into a signal detector 41 which may be directly connected to the computer 15. By pressing against the panel 13′ along the path of the beam 23′ with an acoustical wave absorbing object that will also acoustically couple to the panel, such as a human finger, the beam is absorbed by the object, thereby interrupting its transmission to the detector 25′. The absence of a signal at the expected time generates a signal at the output of detector 41 for application to the computer 15.

Figure 4:
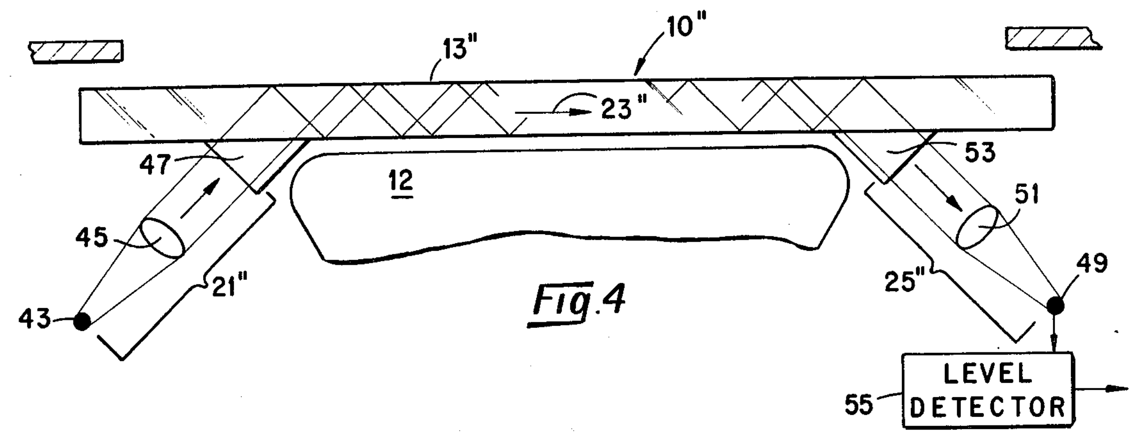
FIG. 4 is a cross-sectional view of a touch actuable data input panel assembly employing internally reflected light waves.

An alternate panel assembly 10″ is shown in cross section in FIG. 4. The assembly 10″ includes a transparent internally reflecting glass panel 13″ with transmitters 21″ and detectors 25″ arrayed around the edges of the panel 13″ in an arrangement that is similar to the assembly 10 (FIG. 2). The transmitter 21″ is comprised of a light source 43, a lens 45 for forming light from the source 43 into a parallel ray light beam 23″, and a prism 47 for coupling the beam 23″ into the panel 13″. The detector 25″ is comprised of a light detector 49, a lens 51 for focusing the parallel ray beam to a point at the detector 49, and a prism 53 for decoupling the beam 23″ from the panel 13″. In operation, the beam 23″ is pulsed or is continuously transmitted from the source 43 through the panel 13″ to the light detector 49. Upon pressing a light interrupting object against the surface of the panel 13″ along the path of the beam 23″, the internal light reflectivity of the panel is reduced and the beam is attenuated, provided the object, e.g., a human finger, optically couples to the panel. This attenuation may be sensed by a level detector 55 to develop an output signal for transmission to the computer 15.

Figure 5:
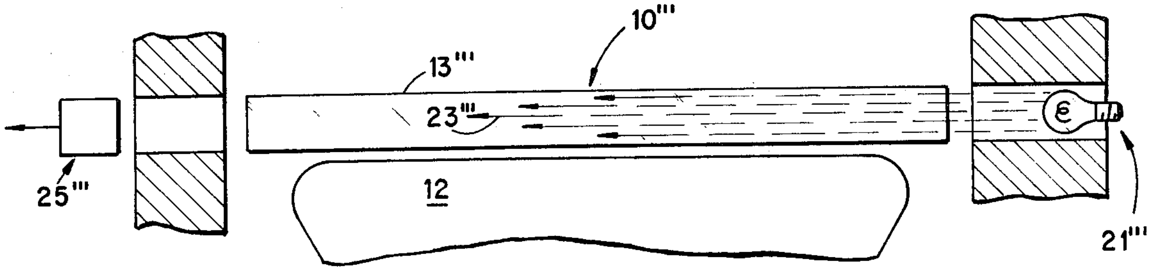
FIG. 5 is a cross-sectional view of a touch actuable data input panel assembly employing light waves propagating directly through a compressible panel.
Figure 6:
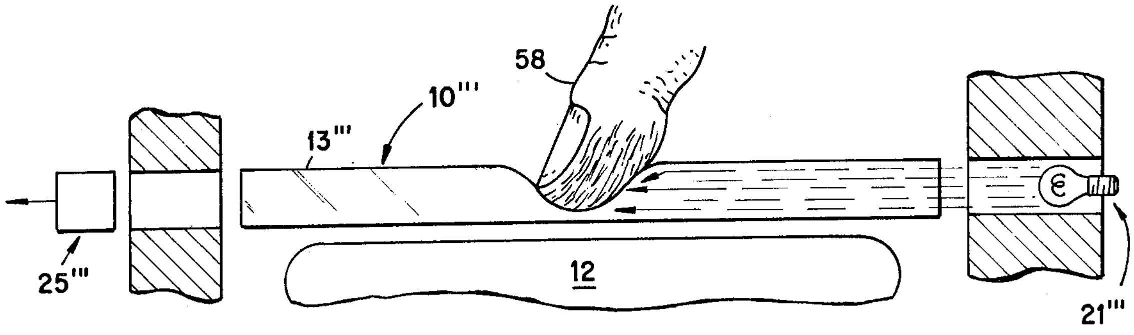
FIG. 6 is a cross-sectional view of the panel assembly of FIG. 5 showing the panel compressed.
Figure 7:
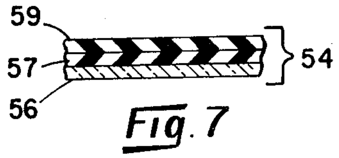
FIG. 7 is a cross-sectional view showing the construction of a particular panel useful in the assembly of FIG. 5.

Another alternate panel assembly 10‴ is shown in cross section in FIGS. 5 and 6. The assembly 10‴ includes a homogeneous transparent compressible panel 13‴ which may be supported directly on the face of the CRT 12. Alternately, the panel 13‴ may be a sandwich 54 (FIG. 7) comprised of a clear glass panel 56, a layer 57 of partially hardened transparent silicone rubber, and a layer 59 of fully hardened transparent silicone rubber over the layer 57. The layer 57 is easily compressible, while the layer 59 protects the soft layer 57. When the sandwich 54 is used, the light beam 23‴ is collimated to pass through the layers 57 and 59. Transmitters 21‴ and detectors 25‴ are arrayed around the edges of the panel 13‴ in an arrangement similar to the assembly 10 (FIG. 2). Each transmitter 21‴ is a collimated light source that projects a beam 23‴ directly through the panel 13‴ to a detector 25‴ positioned directly opposite the transmitter. In operation, pressing the panel 13‴ with an opaque object such as a human finger 58 causes the panel to compress and the beam 23‴ to be blocked. The absence of a signal at the detector 25‴ may be used to develop an output signal for application to the computer 15.

A panel assembly exemplifying the invention was constructed in which a flat glass panel was used. The panel was three-eighths inch thick, 18 inches long and 12 inches wide. Eight Rayleigh wave transmitters 21′ were positioned along one edge of the panel and ten transmitters 21′ were positioned along an adjacent edge. Corresponding Rayleigh wave detectors 25′ were positioned opposite each of the transmitters along the opposite edges of the panel. The transmitters were driven at a steady frequency of 8.4 MHz to form a beam one-half inch wide at the transmitter. The beam dispersed to a width of ½ inch + 1mm at the opposing detector. The input power to each transmitter was 100 mw while the transduced signal at the output of the detector was 20 mv. Upon moderate pressing of a finger in the path of one of the beams, the detected signal was attenuated 90 percent. However, objects which do not couple well with the glass panel such as paper, metal, cloth, water, etc. did not significantly affect the beams. By adjusting the signal level response of the detector, the finger pressure required for actuation was varied. The panel assembly was positioned over a Hewlitt-Packard HP-1300A X-Y Display Unit which displayed control patterns having a maximum of 80 control points. The assembly was coupled to a Scientific Data Systems SDS-925 computer and successfully controlled some magnets of the Stanford 2-mile linear accelerator.

While an embodiment of the invention has been shown and described, further embodiments or combinations of those described herein will be apparent to those skilled in the art without departing from the spirit of the invention.

What is claimed is:

1. A touch actuable data input panel assembly for controlling a machine to function in accordance with the area of the panel that is touched, comprising:
- a panel;
- means for displaying a machine control pattern on said panel, said pattern comprising a plurality of discrete areas each corresponding to a machine function;
- a first plurality of Rayleigh wave beam generating means positioned along a first edge of said panel for simultaneously generating a first plurality of Rayleigh wave beams for propagation through said panel along paths that correspond to and traverse the discrete areas of said pattern;
- a first plurality of Rayleigh wave beam detectors positioned along an edge of said panel opposite said first edge, each detector corresponding to one of said first plurality of beam generating means and each being positioned to receive a corresponding one of said beams, each of said beams being interruptable upon the pressing of a beam interrupting object against the panel in one of said discrete areas along the path of each beam to thereby effect an output signal at the corresponding detector;
- said panel being solid and each of said plurality of beam generating means and beam detectors including a piezoelectric crystal, and a Lucite wedge having a first planar surface in contact with said crystal, said wedge having a second planar surface that is at an acute angle with said first surface, said second surface being acoustically coupled to said panel;
- means for electrically driving each of said plurality of beam generating means; and
- means coupled to each of said beam detectors for generating an output signal in the absence of a beam to a detector for controlling the machine to function in accordance with the function represented by the discrete area of the panel that is touched.

2. The panel assembly of claim 1, further including
- a second plurality of Rayleigh beam generating means positioned along a third edge of said panel for simultaneously generating a second plurality of Rayleigh wave beams for propagation through said panel along paths that are at right angles to said first plurality of beams and that correspond to said pattern; and
- a second plurality of Rayleigh wave beam detectors each corresponding to one of said second plurality of beam generating means and each positioned along an edge of said panel opposite said third edge, each of said second detectors being positioned to receive a corresponding one of said second beams, each of said second beams being interruptable upon the pressing of a finger against the panel along the path of each second beam to thereby effect an output signal at the corresponding second detector.

3. The panel assembly of claim 1, wherein said displaying means includes means for displaying successive different patterns on said panel.

4. The panel assembly of claim 3, wherein said displaying means includes a cathode-ray tube for projecting a pattern on said panel.

5. The panel assembly of claim 4, further including a computer for controlling the pattern to be displayed by said cathode-ray tube, said computer being coupled to said panel assembly and responsive to actuation thereof for functioning in accordance with the actuation.

6. A touch actuable data input panel assembly, comprising:
a transparent panel of the internal light reflecting type;
means for displaying a pattern on said panel;
a first plurality of beam generating means positioned along a first edge of said panel for simultaneously generating a first plurality of parallel ray beams for propagation through said panel along paths that correspond to said pattern, each of said beam generating means including a light source, a lens for focusing light from said source into a parallel ray beam and a coupling prism for coupling said parallel ray beam into said panel at an acute angle; and
a first plurality of beam detectors positioned along an edge of said panel opposite said first edge, each detector corresponding to one of said first plurality of beam generating means and each being positioned to receive a corresponding one of said beams, each of said beams being interruptable upon the pressing of a beam interrupting object against the panel along the path of each beam to thereby effect an output signal at the corresponding detector, each of said beam detectors including a decoupling prism for bringing said beam of light rays out of said panel at an acute angle, a lens for focusing said beam from said decoupling prism to a point, and a light detector at said point that is normally energized by said light ray beam.

7. The panel assembly of claim 6, wherein said displaying means includes means for displaying successive different patterns on said panel.

8. The panel assembly of claim 7, wherein said displaying means includes a cathode-ray tube for projecting a pattern on said panel.

9. A touch actuable data input panel assembly, comprising:
a compressible panel including a stiff transparent sheet, a layer of partially hardened transparent silicone rubber over one side of said sheet, and a layer of fully hardened transparent silicone rubber over said partially hardened layer;
means for displaying a pattern on said panel;
a first plurality of beam generating means positioned along a first edge of said panel for simultaneously generating a first plurality of beams for propagation through said panel along paths that correspond to said pattern, each of said plurality of beam generating means being a collimated light source for transmitting a collimated light beam directly through said panel; and
a first plurality of beam detectors positioned along an edge of said panel opposite said first edge, each detector corresponding to one of said first plurality of beam generating means and each being positioned to receive a corresponding one of said beams, each of said beams being interruptable upon compression of said panel by the pressing of a beam interrupting object against the panel along the path of each beam to thereby effect an output signal at the corresponding detector, each of said detecting means being a light detector that is normally energized by a collimated beam.

10. The panel assembly of claim 9, wherein said displaying means includes a cathode-ray tube for projecting a pattern on said panel.

* * * * *